US008627056B2

(12) United States Patent
Lee

(10) Patent No.: US 8,627,056 B2
(45) Date of Patent: *Jan. 7, 2014

(54) METHODS AND SYSTEMS FOR MODIFYING DISK IMAGES TO PROVIDE NETWORK INTERFACE CARD TEAMING CAPABILITIES

(71) Applicant: Citrix Systems, Inc., Fort Lauderdale, FL (US)

(72) Inventor: Moso Lee, Nashua, NH (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,490

(22) Filed: Jan. 25, 2013

(65) Prior Publication Data

US 2013/0138944 A1    May 30, 2013

Related U.S. Application Data

(63) Continuation of application No. 12/754,397, filed on Apr. 5, 2010, now Pat. No. 8,386,762.

(60) Provisional application No. 61/166,762, filed on Apr. 5, 2009.

(51) Int. Cl.
*G06F 9/00*    (2006.01)
*G06F 15/177*    (2006.01)

(52) U.S. Cl.
USPC .................................. 713/2; 713/1; 370/409

(58) Field of Classification Search
USPC ............................................ 713/1, 2; 370/409
See application file for complete search history.

(56) References Cited

U.S. PATENT DOCUMENTS

| 7,444,405 | B2 | 10/2008 | Gangadharan |
| 7,478,173 | B1 | 1/2009 | Delco |
| 7,586,842 | B2 * | 9/2009 | McGee et al. ................. 370/218 |
| 7,693,044 | B2 * | 4/2010 | Jha et al. ........................ 370/216 |
| 8,121,051 | B2 | 2/2012 | McGee et al. |
| 8,224,988 | B2 | 7/2012 | Kubota |
| 2008/0089326 | A1 | 4/2008 | Kotrla et al. |

OTHER PUBLICATIONS

European Search Report on 13169862.3 mailed Jul. 26, 2013.

(Continued)

*Primary Examiner* — Jaweed A Abbaszadeh
(74) *Attorney, Agent, or Firm* — Foley & Lardner LLP; John D. Lanza

(57) ABSTRACT

A system for modifying a virtual disk to provide network interface card (NIC) teaming capabilities to a virtual disk. The system can include a virtual disk that has access to one or more NICs. In some instances, the NICs are included in a NIC team that is also available to the virtual disk. A teaming module executing on a computer can identify the NIC team and responsively obtain a media access control (MAC) address of the NIC team. In response to obtaining the NIC team MAC address, the teaming module can obtain a network boot MAC address that was used to PXE boot the virtual disk. The teaming module can then replace the NIC team MAC address of each NIC in the NIC team with the obtained network boot MAC address. The system then boots from the virtual disk that has the modified NIC team configuration.

20 Claims, 6 Drawing Sheets

(56) References Cited

OTHER PUBLICATIONS

Citrix Systems, Inc.: "Citrix Provisioning Server 4.5 SP2, Release Notes, Sep. 2008, Document Rev.1", XP002611510, Retrieved from the Internet: URL:http//support.citrix.com/serylet/KbServlet/download/18159-102-19126/ReleaseNotes.pdf[retrieved on Nov. 26, 2010] p. 4-p. 7.

International Preliminary Report on Patentability for PCT/US2010/030014 mailed Oct. 20, 2011.
International Search Report for PCT/US2010/030014 mailed Oct. 12, 2010.
Notice of Allowance on U.S. Appl. No. 12/754,397 dated Dec. 13, 2012.
Written Opinion of the International Search Authority for PCT/US2010/030014 dated Oct. 5, 2011.

* cited by examiner

METHODS AND SYSTEMS FOR MODIFYING DISK IMAGES TO PROVIDE NETWORK INTERFACE CARD TEAMING CAPABILITIES

CROSS REFERENCE TO RELATED APPLICATIONS

This Application is a continuation of application Ser. No. 12/754,397, titled "Methods and Systems for Modifying Disk Images to Provide Network Interface Card Teaming Capabilities" filed on Apr. 5, 2010, which claims priority to U.S. Provisional Patent Application No. 61/166,762, entitled "Methods and Systems for Modifying Disk Images to Provide Network Interface Card Teaming Capabilities" filed on Apr. 5, 2009, all of which are incorporated herein by reference for all purposes.

RELATED APPLICATIONS

This U.S. Patent Application claims priority to U.S. Provisional Patent Application Ser. No. 61/166,762, filed on Apr. 5, 2009, the disclosure of which is considered part of the disclosure of this application and is herein incorporated by reference in its entirety.

FIELD OF THE DISCLOSURE

This application relates generally to generating and delivering virtual hard disk images. More specifically, the application relates to generating and delivering virtual hard disk images that have network interface card teaming capabilities.

BACKGROUND OF THE DISCLOSURE

Link aggregation is a technology that can be used to link together multiple network ports to create a level of redundancy within a networked environment and to increase the speed by which information is transmitted and processed. In some instances, link aggregation can be used to load balance network traffic amongst multiple network interface cards (NICs), and can provide a level of fault tolerance and redundancy should one or more NICs fail. In most cases implementations of link aggregation in a system may conform to the IEEE 802.1AX standard or the IEEE 802.3ad standard. Link aggregation can be accomplished by teaming NICs together using teaming software or some other software or hardware configuration able to link together multiple NICs. Linking or trunking together NICs can permit the creation of a NIC aggregation that can transmit and receive data over a network at speeds much greater than the speed at which any single network interface card within the aggregation can transmit or receive data.

When creating a virtual hard disk for use in a network boot system, a network filter driver associated with a network stack may bind to each of the physical network interface cards on a provisioning server. If multiple network interface cards on the provisioning server have been trunked or linked together via network interface card teaming software, the network interface card teaming software can create a single unified virtual network interface card team to which the network filter driver will bind. Teaming software creates a network interface card team by associating each NIC team member's physical MAC address. When provisioning the virtual hard disk to a client machine, issues arise because the MAC addresses of the NICs differ on different machines. Therefore, the NIC teaming software cannot establish a team during boot time and therefore fails to stream the virtual disk.

The issues posed by creating a virtual disk based in part on a physical disk employing a teaming module to link network interface cards may not be overcome by using the physical network interface card details of the client machine and presenting them to the streamed operating system. Such a solution likely will fail because the MAC addresses associated with the physical network interface cards will differ from the MAC addresses on different computing machines. This difference can confuse the network stack and hinder the network stack from operating both efficiently and properly. NIC teaming may also be limited to a private image mode because the physical MAC addresses differ from machine to machine. The differing MAC addresses make it difficult for the NIC teaming software to re-create a NIC team during boot time since each NIC team identifies the underline physical NIC by MAC address. Thus, a need exists for a virtual disk creation and delivery method that permits the virtual disk to retain its network interface card teaming capabilities without hindering the virtual disk provisioning process.

SUMMARY OF THE DISCLOSURE

In its broadest interpretation, this disclosure describes systems and methods for provisioning a virtual disk having network interface card teaming capabilities. Linking network interface cards (NIC) together using network interface card teaming software creates a NIC team which is an aggregate of the linked NICs. This NIC team can be used in the system as a single NIC that transmits and receives network data at speeds greater than a single network interface card within the team. Issues can arise when this NIC team is included in a virtual disk because that virtual disk can identify the NIC team as the boot network interface card that can be used to stream applications and content to the virtual disk. In many instances, a NIC teaming software requirement can be that the NIC MAC addresses stored in a registry, match the MAC address of the NIC team. The problems posed by requiring that the NICs of a NIC team have the same MAC address of the NIC team can be overcome by identifying virtual protocol binding information associated with a NIC team and using that information to identify all the NICs within a team. This solution is employed by the methods and systems described herein.

In one aspect, described herein is a method for modifying a virtual disk to provide network interface card (NIC) teaming capabilities. A teaming module executing on a computer can identify a NIC team available to a virtual disk. In response to identifying the NIC team, the teaming module can obtain a media access control (MAC) address of the NIC team. Responsive to obtaining the NIC team MAC address, the teaming module can obtain a network boot MAC address used to PXE boot the virtual disk. The teaming module can then replace the NIC team MAC address of each NIC in the NIC team with the obtained network boot MAC address. The virtual disk is then booted to create the NIC team.

In some embodiments, the network boot MAC address can comprise a PXE boot MAC address of a NIC used to PXE boot the virtual disk.

In other embodiments identifying the NIC team can further include enumerating each NIC that is included in the NIC team.

Identifying the NIC team, in other embodiments, can include identifying a NIC team that is configured to bind to a network stack filter driver. In some instances, identifying a NIC team bound to a network stack filter driver can include parsing a registry of the virtual disk for a subkey specifying a bind to the network stack filter driver. In other instances, the NICs of the NIC team can be enumerated by parsing the registry for NICs that have a global identifier substantially similar to a global identifier of the NIC team. In still other embodiments, the NIC team MAC address can be bound to the network stack filter driver.

In one embodiment, booting the virtual disk to create the NIC team can include updating a registry of the virtual disk to include the network boot MAC address.

In some instances, described herein is a system for modifying a virtual disk to provide network interface card (NIC) teaming capabilities. The system can include a virtual disk, and a NIC team that is available to the virtual disk and that includes a multiple NICs. A NIC teaming module executing on a computer can identify the NIC team and obtain, responsive to identifying the NIC team, a media access control (MAC) address of the NIC team. The teaming module can obtain responsive to obtaining the NIC team MAC address, a network boot MAC address used to PXE boot the virtual disk, and replace the NIC team MAC address of each NIC in the NIC team with the obtained network boot MAC address. The system then boots from the virtual disk that has the modified NIC team configuration.

BRIEF DESCRIPTION OF THE DRAWINGS

The following figures depict certain illustrative embodiments of a the methods and systems described herein, where like reference numerals refer to like elements. Each depicted embodiment is illustrative of the method and system and not limiting.

DETAILED DESCRIPTION

Figure 1A:
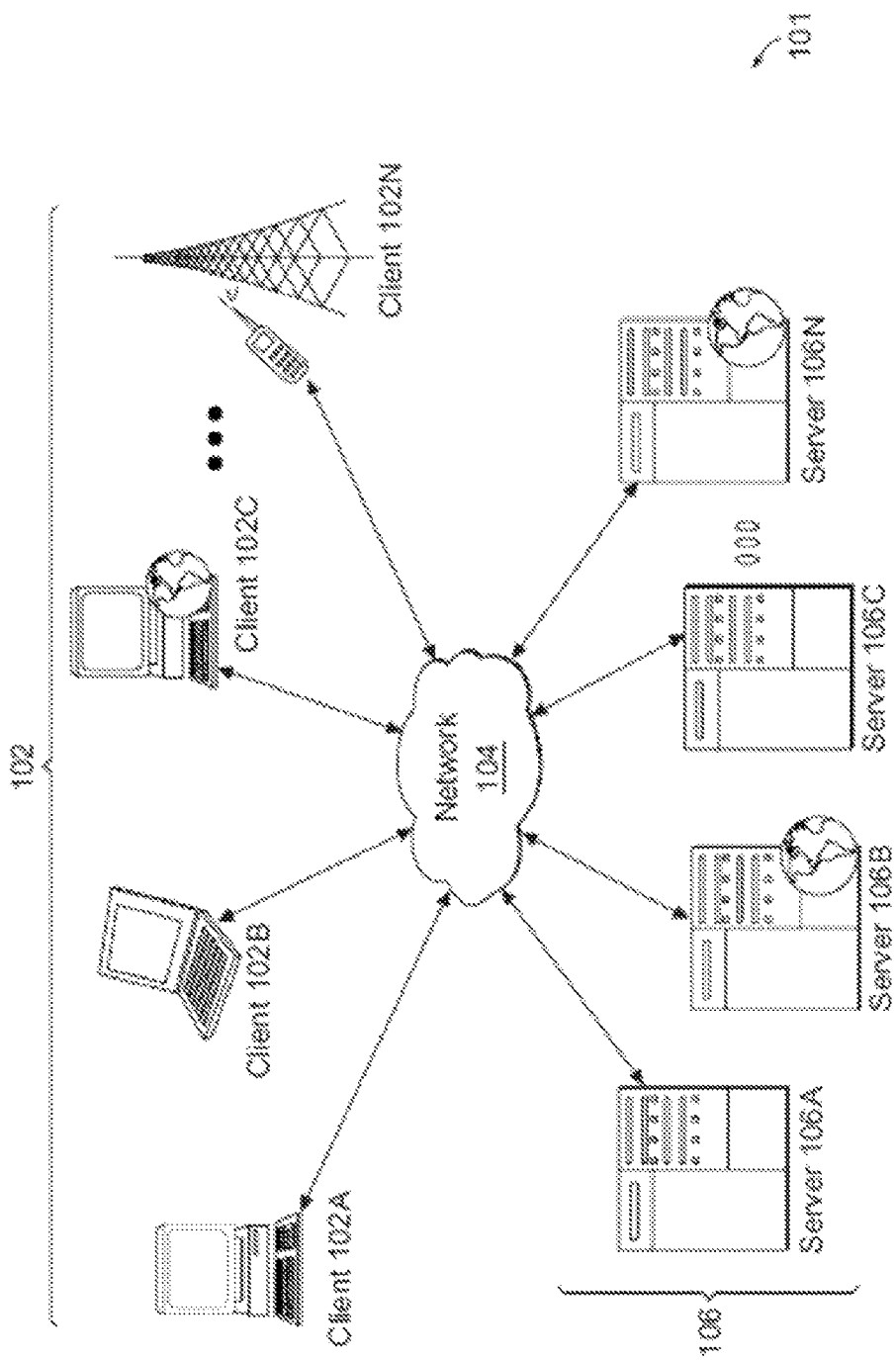
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
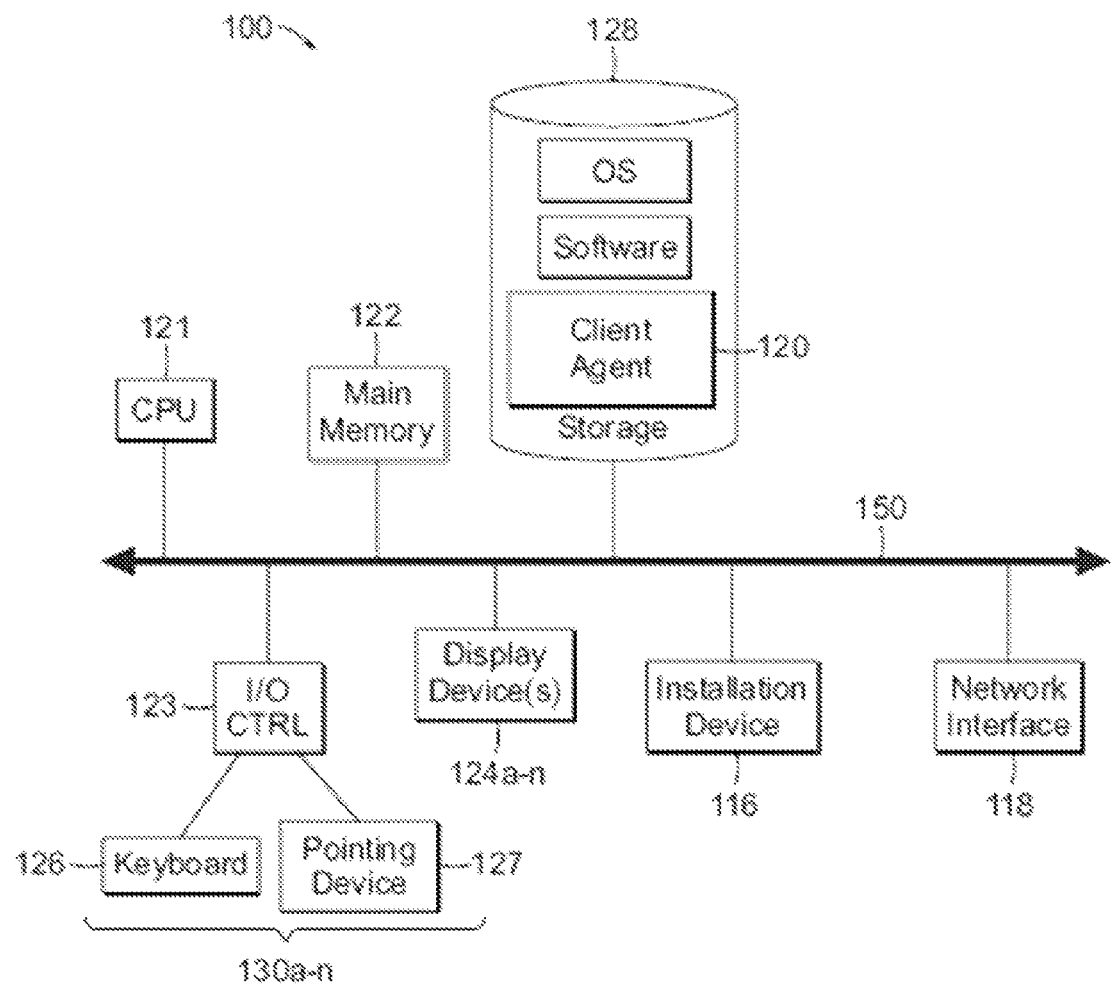
FIG. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
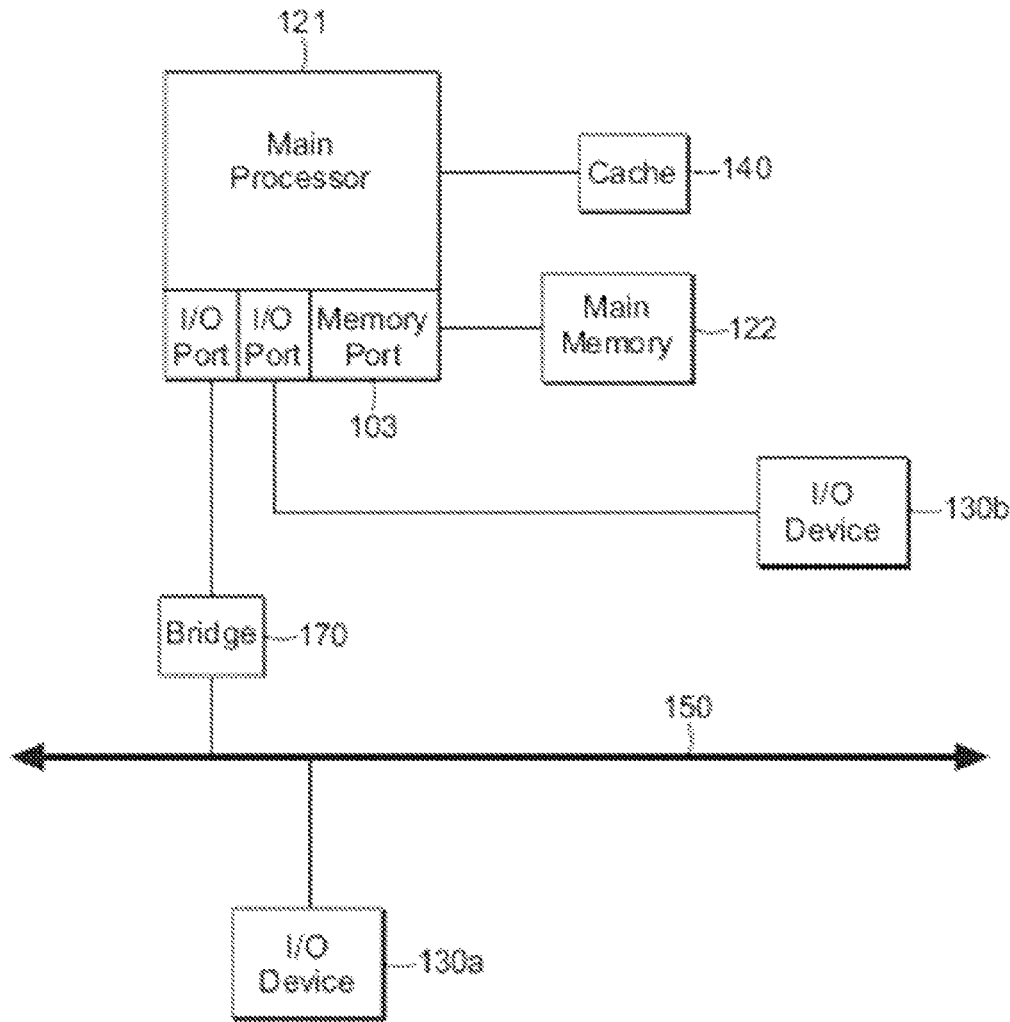

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121, may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Illustrated in FIG. 2 is block diagram that illustrates an embodiment of a physical machine 302 environment configured to provision a virtual disk, but not configured to provision a virtual disk having network interface card (NIC) teaming capabilities. The physical machine 302 includes a set of communication protocols such as the TCP/IP protocols 314 or the IPX/SPX protocols 316 that can be used to transmit data over a network. The physical machine further includes two NICS, NIC 1 310 and NIC 2 312. Also included in the physical machine 302 a network driver interface specification (NDIS) wrapper 304 in communication with a network stack filter driver 306, a first NIC driver 320, a second NIC driver 326, a first miniport driver instance 322 and a second miniport driver instance 328. The network filter driver (BNNS) 306 is further in communication with a protocol driver (BNIStack) 308.

Further referring to FIG. 2, and in more detail, the physical machine 302 is a computing machine having the ability to perform logic or functions in accordance with programmed instructions. In some embodiments, the physical machine 302 may be a computing workstation, a desktop computer, a laptop or notebook computer, a server, or any of the other embodiments of the computing machine 100 listed above. Still further embodiments include a physical machine 302 that is referred to by any of the following identifying labels: computing machine; computer; local computing machine; remote computing machine; first computing machine; second computing machine; third computing machine; machine; or any other identifier used to denote some type of system having a processor and a memory element, wherein the processor is able to execute software commands. The physical machine 302 may be a physical computing machine or virtual computing machine, and may have a characteristic or characteristics identifying the computing machine as one of either of a physical machine or virtual machine.

A local physical disk (not shown) can be, in some embodiments, included in the physical machine 302 and can be a hard disk drive. In further embodiments, the local physical disk may be a combination of physical or virtual disks in a Redundant Array of Independent Disks (RAID). In one embodiment, the local physical disk is in direct communication with any one of the following machine components: an installer program (not shown), and the network driver interface specification (NDIS) wrapper 304. In another embodiment, the local physical disk (not shown) communicates with the following machine components: a first NIC driver 320, a second NIC driver 326, a first miniport driver instance 322 and a second miniport driver instance 328. While in some embodiments a local physical disk can be included, in other embodiments a virtual disk can be included.

In communication with the NDIS wrapper 304 is a network filter driver (BNNS) 306 that intercepts network packets and determines if the network packets should be de-multiplexed to the NDIS wrapper 304 or BNIStack 308. In one embodiment the BNNS 306 can determine a packet's destination by examining the packet's header, and determining whether the sockets match. The BNNS 306 is an intermediate driver for the NDIS wrapper 304 in that it can bind to third-party NICs and provide some network services. BNNS 306 is in communication with the BNIStack 308 which is the protocol driver for computing machines. The BNIStack 308 can send and receive messages from the filter driver (BNNS) 306 that filters all read/write requests issued to a virtual disk on either a client or a server. When the read/write requests are issued to a virtual disk, the requests are filtered and sent to the protocol driver 308.

Further in communication with the NDIS wrapper 304 is a grouping of elements related to the first NIC 310 and the second NIC 312 including a NIC driver 320, 326 and a miniport driver instance 322, 328. The first and second NIC drivers 320, 326 are drivers used by the operating system or the NDIS wrapper 304 to communicate with the first and second NICs 310, 312. In some embodiments, the NIC drivers 320, 326 can be device drivers that provide an abstraction layer between the physical NICs 310, 312 and the operating system. The first and second miniport driver instances 322, 328 can facilitate communication between the operating system and operating system components and other class drivers such as the NIC drivers 320, 326. In one embodiment, the first and second miniport driver instances 322, 328 are drivers that provide support for a specific network interface card present in a physical machine by translating inputs and outputs from the physical NIC into a format that the operating system can read and interact with, and may enable a computing machine to communicate over a network with a second computing machine (not illustrated). In one embodiment, each of the NIC drivers 320, 326; and the miniport driver instances 322, 328 are used by the computing machine to communicate with the NICs 310, 312 and to further communication over a network with remote computing machines.

In one embodiment, a NDIS wrapper 304 is included in the physical machine 302. The NDIS wrapper 304, in some embodiments, is a set of export libraries that provide both an abstraction layer and portability for all interactions between a NIC or NIC miniport driver and the operating system. When a program instructs the physical machine 302 to bind to a miniport driver 322, 328, the NDIS wrapper 304 may generate the resultant binding information which can be stored within the operating system, and included within the created virtual disk. In one embodiment, the physical machine 302 may contain, in lieu of the NDIS wrapper 304, an application, function, routine, logic, virtual object, or other set of code instructions having substantially equivalent functionality to that of the NDIS wrapper 304.

Further included in the physical machine 302 is a first and second NIC 310, 312. In some embodiments, the NICs 310, 312 can be the same type of NIC, while in other embodiments, the NICs 310, 312 can be different types of NICs. The NIC can be referred to as a network adapter, a network interface controller, a LAN adapter or any other moniker indicating that the NIC is a hardware component within the physical machine 302 that permits the physical machine 302 to communicate over a network with other machines. In many embodiments, the NICs 310, 312 use MAC addresses, or unique serial numbers assigned to each NIC, to provide low level addressing at the physical network layer. While FIG. 2A illustrates two NICs 310, 312, in other embodiments, any number of NICs can be included in the physical machine 302.

Figure 2A:
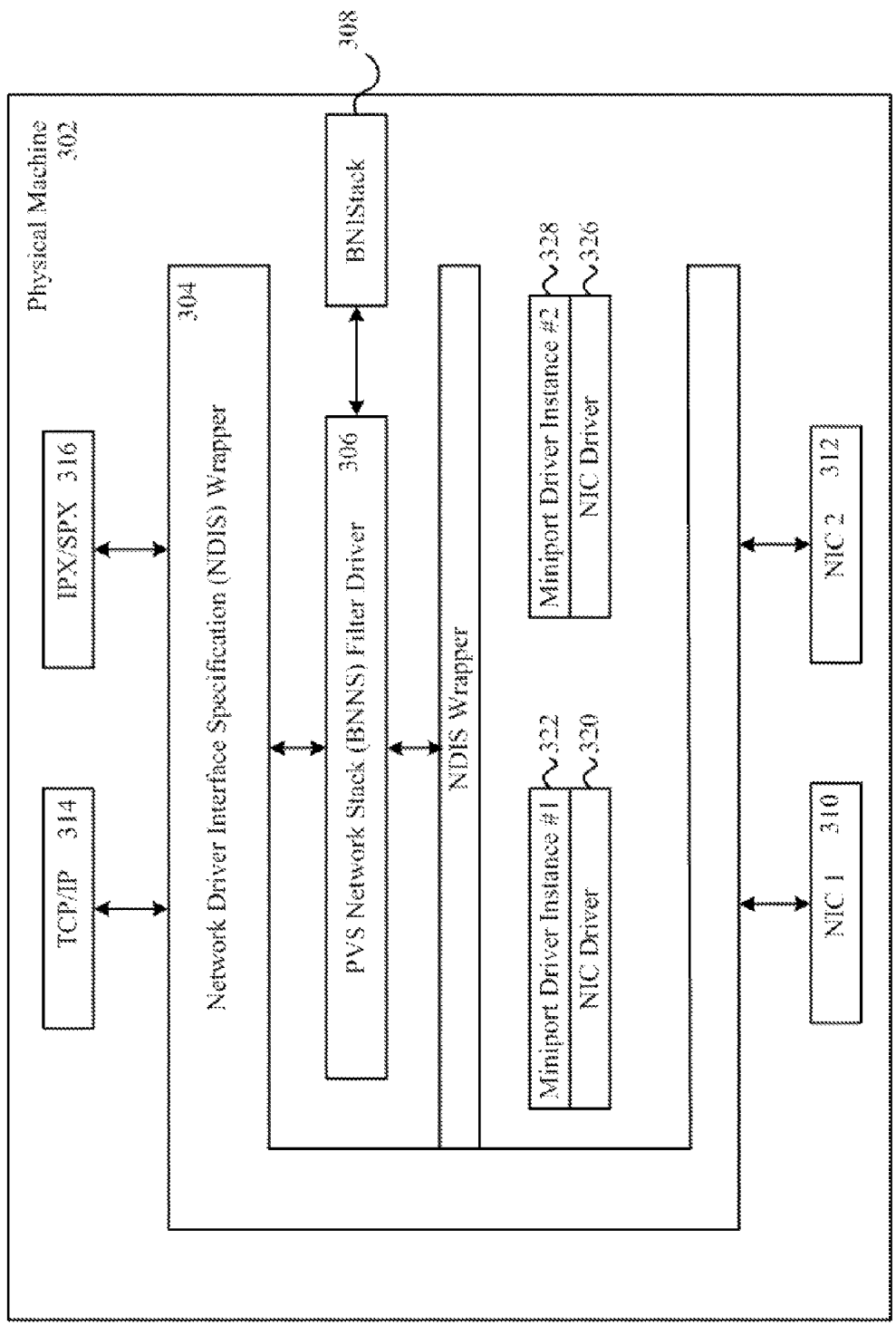
FIG. 2A is a block diagram illustrative of an embodiment of a physical machine.

In one embodiment, the system described in FIG. 2A can include a NIC teaming intermediate driver that can be used to implement a NIC team. The NIC teaming intermediate driver, in some embodiments, can be any NIC teaming driver. In other embodiments, the NIC teaming intermediate driver can be a NIC teaming driver manufactured by INTEL, INTEL ADVANCED NETWORKING SERVICES, or BROADCOM, BROADCOM ADVANCED SERVER PROGRAM. The NIC teaming driver can balance inbound and outbound network traffic amongst one or more NICs. In one embodiment, the NIC teaming driver can act as a single virtual protocol driver, and can enumerate a single virtual miniport interface that the upper NDIS wrapper 304 can communicate with. Thus, the NIC teaming driver can act as a single driver for all NICs included in the system. Further, the NIC teaming driver can handle load balancing and fault tolerance for the network traffic handled by each NIC in the NIC team.

In some embodiments, the BNNS filter driver 306 can interface with the NIC teaming driver to take advantage of the functionality provided by the NIC teaming driver. Embodiments where the BNNS filter driver 306 positions itself on top of a NIC teaming driver may include: a NIC miniport driver that can load at boot time (Start=0); a NIC intermediate driver that can load at boot time (Start=0); and a target device that can be installed after NIC teaming is properly installed and configured. In the above-mentioned embodiment, the NIC teaming driver may only expose one teamed NIC network interface through software based multiplexing or hardware based 802.3ad link aggregation for the upper layer application (BNNS) 306. Applications such as operating system streaming and remote application delivery applications (e.g. XENAPP, XENDESKTOP) traffic can benefit from NIC teaming. Further, the virtual disk or the target computer onto which the virtual disk is installed, may take advantage of the NIC teaming, the NIC hardware and software rich functionality. The remote application delivery application may also benefit from NIC teaming since it only needs to communicate with the single IP address.

Figure 2B:
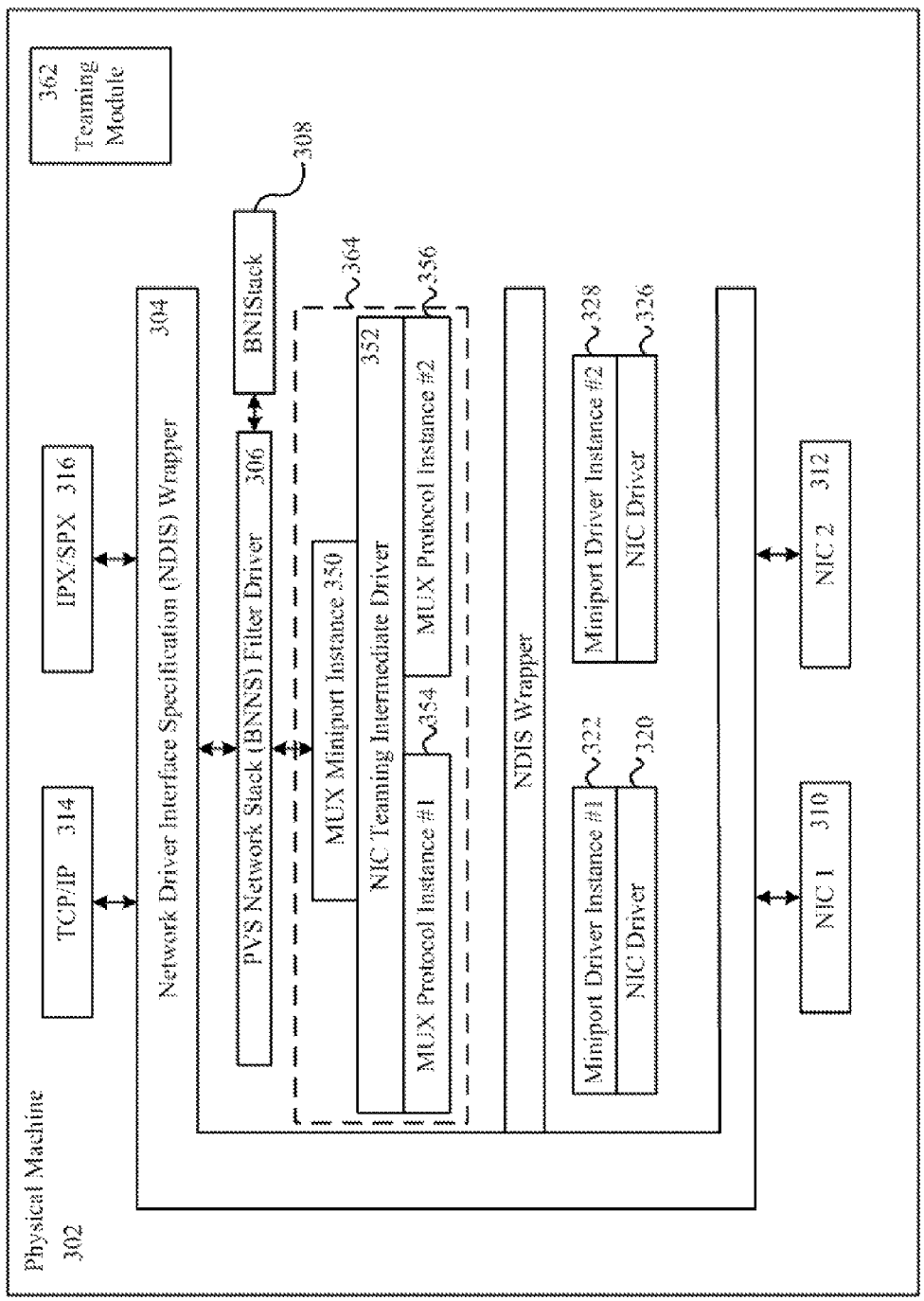
FIG. 2B is a block diagram illustrative of an embodiment of a physical machine employing network interface card teaming.

Illustrated in FIG. 2B is an embodiment of the system illustrated in FIG. 2A that further includes a teaming module 362 that can facilitate changing the configuration of the members of the NIC team. Also included in this embodiment of the physical machine are the elements of NIC teaming software that can be used to create the single aggregate NIC 364 representative of the NIC team, these elements include: a MUX miniport driver 350 in communication with a NIC teaming intermediate driver 352 which is further in communication with a first MUX protocol instance 354 and a second MUX protocol instance 356. All other aspects of the physical machine 302, as described in FIG. 2A, are included.

The teaming module 362 can be any program, set of commands or software element executable by a processor on the physical machine 302 to alter the NIC teaming software 364 and further alter the configuration of the NIC team created by the NIC teaming software. In one embodiment, the teaming module 362 can carry out the method 402 illustrated in FIG. 3. In another embodiment, the teaming module 362 can carry out any number of steps needed to alter the MAC addresses of the members of a NIC team so that they all have a team MAC address corresponding to the MAC address of a NIC used to PXE boot a streamed virtual hard disk. In some embodiments, the teaming module 362 may execute on the physical machine 302 while in other embodiments, the teaming module 362 may execute on a remote computing machine in communication with the physical machine 302.

A third party or proprietary teaming software 364 can be used to create a NIC team. This NIC teaming software 364 can in some embodiments be used to generate the driver components of a single aggregate NIC 364 representative of the NIC team. In one embodiment, the teaming software 364 can include a multiplexed miniport driver 350 that comprises the NIC team's virtual miniport binding information, the NIC teaming intermediate driver 352 and the first and second multiplexed (MUX) protocol instances 354, 356. In one embodiment, the first and second MUX protocol instances 354, 356 correspond to the members of the NIC team which in this embodiment is the first and second NIC 310, 312. The number of MUX protocol instances 354, 356 can in some embodiments correspond to the number of NICs included in the team. The physical machine 302 uses the NIC teaming software 364 components as the drivers used to communicate with the members of the NIC team, i.e. the first and second NICS 310, 312, and to communicate over a network with remote computing machines. In some embodiments, the NIC teaming software 364 can load balance the transmission and receipt of network packets amongst the members of the NIC team. Load balancing using the NIC teaming software 364 can increase the speed at which network packets are transmitted and received over the network. In other embodiments, the NIC teaming software 364 can be used to introduce NIC redundancy by issuing transmit/receive commands to a second NIC team member when a first NIC team member fails. The teaming software 364 can in some embodiments generate the NIC team with a NIC team virtual MAC address or network address.

While FIGS. 2A and 2B illustrate embodiments of a system that utilizes NIC teaming, in some embodiments the systems can be employed on a virtual disk. Thus, the components illustrated as executing on the physical machine 302 can execute on a virtual disk. In some embodiments, the virtual disk can be deployed on a virtual machine, while in other embodiments the virtual disk can be deployed on a physical machine 302. In some embodiments, substantially each one of the components, with the exception of the physical NICs 310, 312 can be deployed on a virtual disk. In other embodiments, substantially each one of the components with the exception of the physical NICs 310, 312 and the teaming module 362 can be deployed on a virtual disk.

Figure 3:
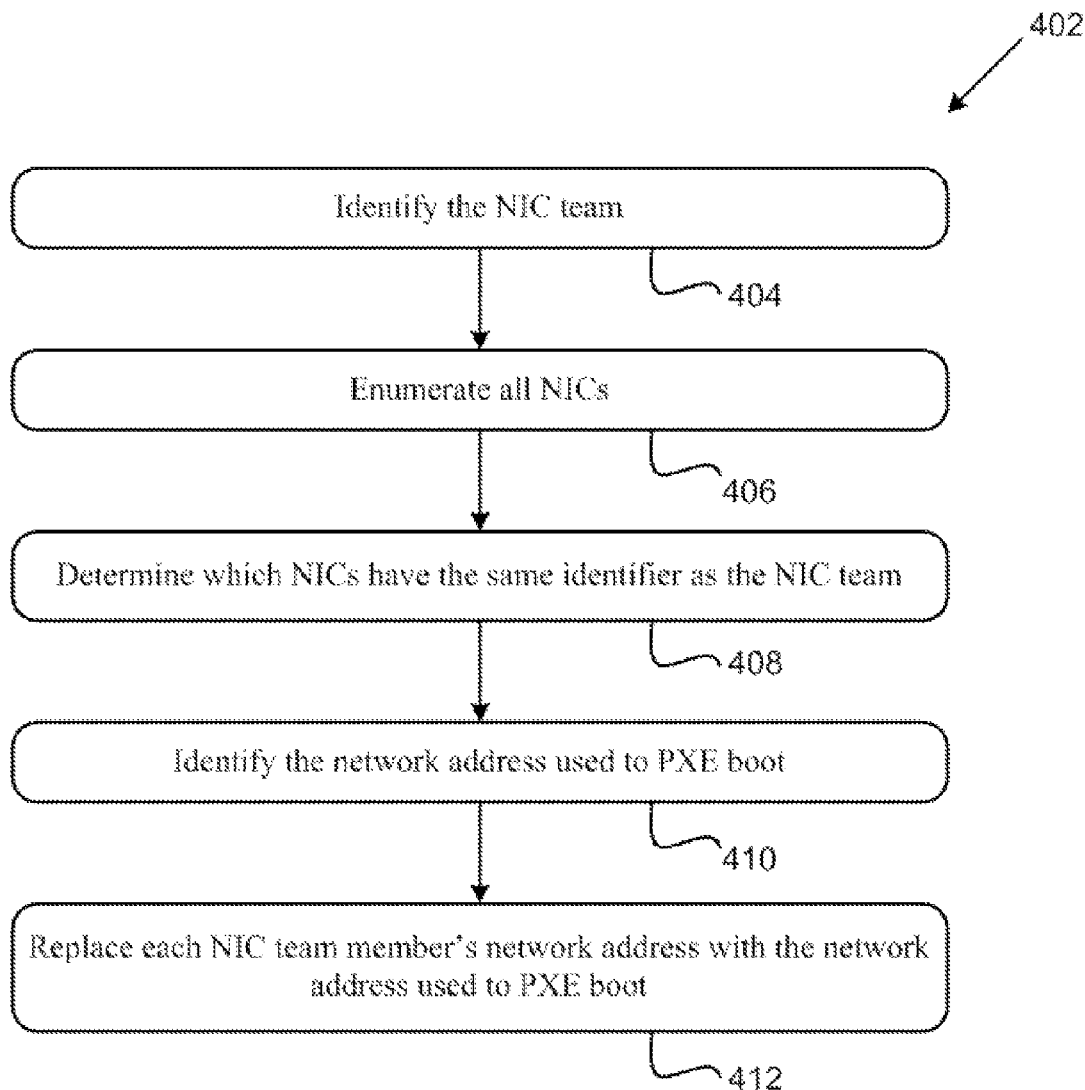
FIG. 3 is a flow diagram illustrative of an embodiment of a method for overriding the MAC address associated with a network interface card team.

Illustrated in FIG. 3 is an embodiment of a method 402 for aiding the NIC teaming software 364 in altering the configuration of the NIC team to further create a virtual disk that can have NIC teaming capabilities once it is streamed to a remote machine. The method 402 includes first identifying the NIC team (Step 404) and then enumerating all of the NICs within the registry (Step 406). Once all of the NICs are enumerated, a determination must be made as to which NICs are within the NIC team (Step 408). The network address or the MAC address of the NIC that the virtual disk uses to PXE boot is identified (Step 410). Once this PXE boot MAC address is identified, the MAC addresses or network addresses of each NIC that is a member of the NIC team is replaced with the PXE boot MAC address (Step 412). In some embodiments, all or portions of the method 402 can be carried out by a teaming module executing on the physical computer. In other embodiments, the teaming module can execute on another computer that is in communication with the physical computer.

Further referring to FIG. 3, and in more detail, the NIC team is identified (Step 404) by identifying whether the upper bind of the NIC team points to the BNNS 306. The upper bind is a characteristic of a NIC that identifies where the NIC should pass packets once they are received. In embodiments where the NIC team's upper bind indicates that network packets should be passed up to the BNNS 306, that NIC team will be identified as the NIC team of interest or the NIC team to be altered by the teaming module 362. In some embodiments, the teaming module 362 identifies the NIC team by searching through a registry or database to identify the NIC team's virtual miniport binding information. In other embodiments, the binding information and therefore the NIC team can be identified by searching through a registry and iterating over subkeys of HKEY_LOCAL_MACHINE\SYSTEM\CurrentControlSet\
Control\Class\{4D36E972-E25-11CE-BFC1-
08002BE10318} to determine which subkey has an upper
bind that specified in BNNS. Determining that the upper
bind specifies BNNS is by finding a subkey where
<XXXX>\Linkage\UpperBind=BNNS. In some embodiments, determining the NIC team includes determining confirmation information associated with the third party NIC team. In one embodiment, the following is recorded by the teaming module 362, <XXXX>\Linkage\Export=\Device\{guid}.

In some embodiments, identifying the NIC team can further include identifying or obtaining the PXE MAC address of the NIC team. This PXE MAC address can be bound to the BNNS 306. Determining the PXE MAC address of the NIC team can include searching through the registry of the virtual disk to identify a key related to a NIC team and bound to the BNNS network filter 306. Obtaining the NIC team MAC address can, in some embodiments, occur in response to identifying the NIC team.

Once the NIC team has been identified, all of the NICs are enumerated (Step 406) by enumerating all NICs and each by searching through the registry for NICs have a global identifier or guid similar to the one stored by the teaming module 362. In one embodiment enumerating all the NICs includes enumerating all the NICs on a physical machine 302. In other embodiments, enumerating all the NICs includes enumerating all the NICs included in the NIC team. Enumerating the NICs in the NIC team can include parsing the registry for NICs that have a global identifier substantially the same as the global identifier of the NIC team.

The teaming module 362 then identifies which NICs are members of the NIC team (Step 408) by determining which of the enumerated NICs have an upper bind specifying BNNS. In some embodiments determining whether an enumerated NIC has an upper bind specifying BNNS includes determining whether the MiniportBindingList subkey matches the LinkageExport of the identified NIC team. The LinkageExport of the identified NIC team is equal to BNNS.

The teaming module 362 then identifies the network address or MAC address used to PXE boot the virtual hard disk (Step 410), and replaces the network address or MAC address associated with each member of the NIC team with the PXE boot MAC address (Step 412). This step, in some embodiments, can occur in response to obtaining the NIC team MAC address. In other embodiments, the PXE boot MAC address can be a network boot address that was used by the system to PXE boot the virtual disk. In one embodiment, the MAC addresses of each NIC within the NIC team are replaced by searching through the subkeys of
HKEY_LOCAL_MACHINE\SYSTEM\CurrentControll-
Set\Control\Class\{4D36E972-E25-11CE-BFC1-
08002BE10318} and inserting the PXE boot MAC address in place of the NIC team virtual network address stored in the registry keys for each NIC team member. In other embodiments, the MAC address of the NIC third party teaming software 364 is replaced with the PXE boot MAC address. Inserting the PXE boot MAC address in place of the virtual MAC address of the NIC team, permits the NIC teaming module included in the virtual disk to configure and recreate the team on a different machine. Once the virtual disk image is corrected via the steps described in the method 402, the virtual disk is streamed to a remote machine.

In some embodiments, replacing the NIC team settings with the PXE boot MAC address can include unbinding and uninstalling the PVS target device. In these embodiments, the virtual disk may be required to be unbound and uninstalled, or the NIC team may be required to be unbound and uninstalled.

In other embodiments, the method can further include booting the system from the virtual disk that has the modified NIC team configuration. This modified NIC team configuration can include the NIC team that has the modified NIC team MAC address. Booting the virtual disk to create the NIC team, in some embodiments, can include updating keys and subkeys of a registry of the virtual disk to include the network boot MAC address or PXE boot MAC address used to replace the NIC team MAC address.

The present disclosure may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, a computer readable medium having instructions executable by a processor, or a magnetic tape. In general, the computer-readable programs may be implemented in any programming language. Some examples of languages that can be used include C, C++, C#, or JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompany claims and their equivalents.

What is claimed is:

1. A method for providing network interface card (NIC) teaming capabilities, the method comprising:
    obtaining, by a teaming module executing on a computer, a media access control (MAC) address of a NIC team;
    obtaining, by the teaming module responsive to obtaining the NIC team MAC address, a network boot MAC address used to PXE boot a virtual disk; and
    replacing, by the teaming module, the NIC team MAC address of each NIC in the NIC team with the obtained network boot MAC address.

2. The method of claim 1, further comprising:
    identifying the NIC team, the NIC team available to the virtual disk.

3. The method of claim 1, further comprising:
    booting the virtual disk to create the NIC team.

4. The method of claim 1, wherein the NIC team includes a plurality of NICs, the method further comprising:
    replacing, by the teaming module, the NIC team MAC address of each NIC of the plurality of NICs in the NIC team with the obtained network boot MAC address.

5. The method of claim 1, further comprising:
    modifying the virtual disk to provide NIC teaming capabilities.

6. The method of claim 1, wherein the virtual disk includes NIC teaming capabilities.

7. The method of claim 1, wherein obtaining the network boot MAC address further comprises obtaining a PXE boot MAC address.

8. The method of claim 1, further comprising:
    identifying the NIC team, the NIC team available to the virtual disk; and
    enumerating each NIC included in the NIC team.

9. The method of claim 1, further comprising:
identifying the NIC team, wherein the NIC team is configured to bind to a network stack filter driver.

10. The method of claim 1, further comprising:
parsing a registry of the virtual disk for a subkey specifying a bind to a network stack filter driver.

11. The method of claim 1, wherein obtaining the NIC team MAC address further comprises:
obtaining a NIC team MAC address bound to a network stack filter driver.

12. The method of claim 1, further comprising:
updating a registry of the virtual disk to include the network boot MAC address.

13. A system for providing network interface card (NIC) teaming capabilities, the system comprising:
a teaming module executing on a computer to:
obtain a media access control (MAC) address of a NIC team available to a virtual disk, the NIC team comprising multiple NICs,
obtain, responsive to obtaining the NIC team MAC address, a network boot MAC address used to PXE boot the virtual disk, and
replace the NIC team MAC address of each NIC in the NIC team with the obtained network boot MAC address.

14. The system of claim 13, further comprising the teaming module executing on the computer to identify the NIC team.

15. The system of claim 14, wherein the teaming module identifies the NIC team by identifying a NIC team bound to a network stack filter driver.

16. The system of claim 15, wherein the NIC team is bound to the network stack filter driver.

17. The system of claim 14, further comprising the teaming module executing on the computer to set, responsive to identifying the NIC team, the media access control (MAC) address of the NIC team.

18. The system of claim 13, wherein the network boot MAC address comprises a PXE boot MAC address of a NIC used to PXE boot the virtual disk.

19. The system of claim 13, further comprising the teaming module executing on the computer to enumerate each NIC included in the NIC team.

20. The system of claim 13, wherein the teaming module updates a registry of the virtual disk to include the network boot MAC address.

* * * * *